United States Patent [19]

Cooley et al.

[11] 4,301,912

[45] Nov. 24, 1981

[54] DIVIDER SCREWS

[75] Inventors: Jack S. Cooley, Atlanta; Roger A. Ziecker, Lawrenceville, both of Ga.

[73] Assignee: The Mead Corporation, Dayton, Ohio

[21] Appl. No.: 132,417

[22] Filed: Mar. 21, 1980

[51] Int. Cl.³ .............................................. B65G 47/68
[52] U.S. Cl. ..................................... 198/436; 198/625
[58] Field of Search ............... 198/436, 440, 441, 450, 198/462, 475, 625, 663, 600

[56] References Cited

U.S. PATENT DOCUMENTS

| | | | |
|---|---|---|---|
| 2,857,037 | 10/1958 | Breeback | 198/436 |
| 2,890,787 | 6/1959 | Carter | 198/625 |
| 2,923,395 | 2/1960 | Hofe | 198/440 |
| 3,783,990 | 1/1974 | Siciliano | 198/600 |
| 3,841,946 | 10/1974 | Carter | 198/625 |

Primary Examiner—Joseph E. Valenza
Attorney, Agent, or Firm—Rodgers & Rodgers

[57] ABSTRACT

Apparatus for dividing a single row of articles into two rows comprises a pair of complementary closely spaced parallel screws arranged to receive a single row of articles from an infeed conveyor so that alternate articles are engaged by the thread of each screw and moved laterally into the groove of the other screw to form two rows of articles, the thread of one screw being cut away at the outfeed end thereof, an outfeed conveyor arranged to receive articles from the outfeed end of the screws and to move the articles at a velocity approximately one-half the velocity of movement of the articles longitudinally between the screws so that the two rows of articles are automatically aligned transversely, and a dead plate interposed between the infeed and outfeed conveyors.

14 Claims, 2 Drawing Figures

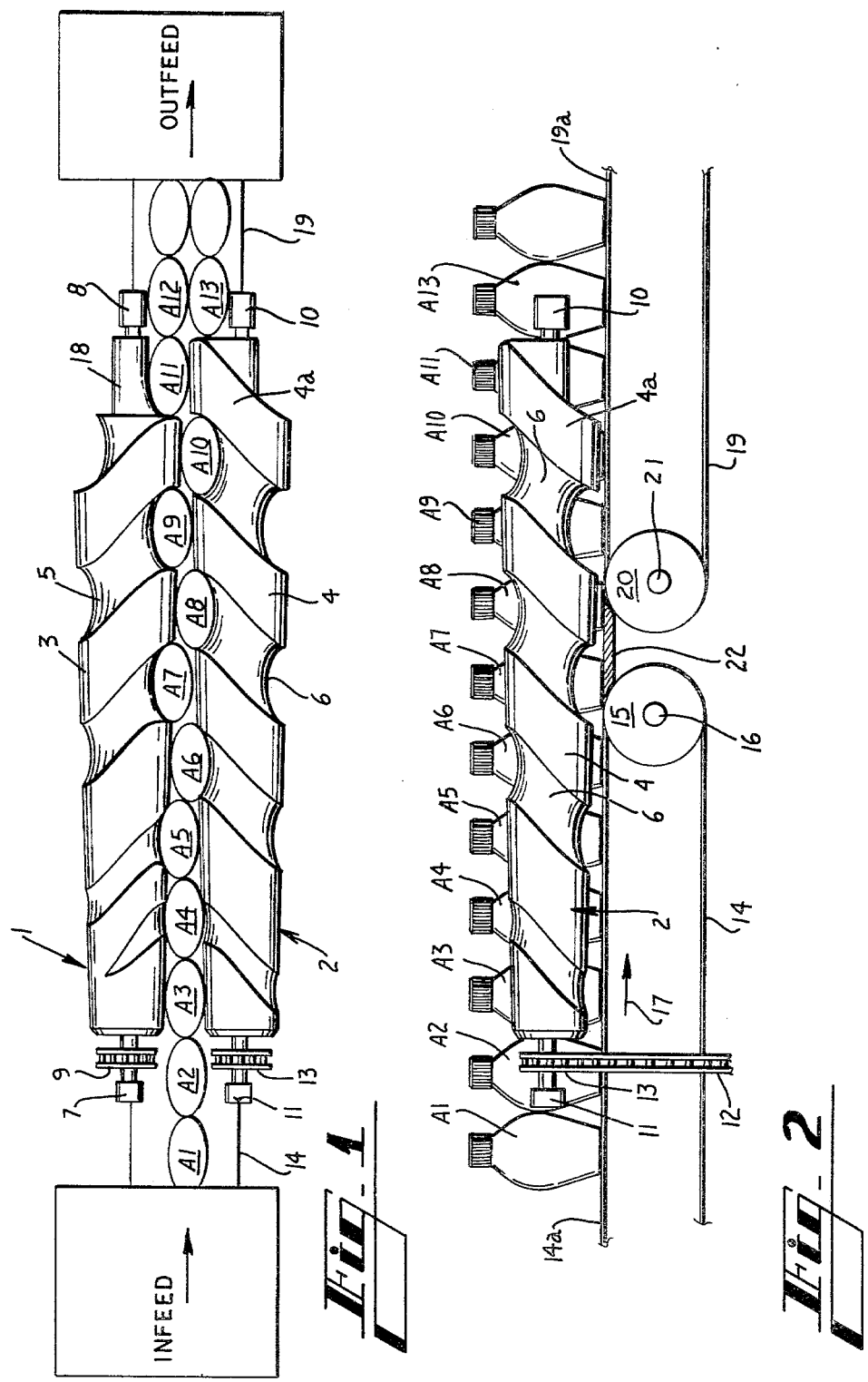

DIVIDER SCREWS

TECHNICAL FIELD

This invention pertains to article handling apparatus generally and is particularly well suited for use in conjunction with packaging machines used to form secondary packages of a plurality of primary packages such as cans or bottles containing consumer items.

BACKGROUND ART

U.S. Pat. No. 2,923,395 issued Feb. 2, 1960 for High Speed Article Separator discloses a pair of complementary oppositely threaded screws for separating a single row of articles into two rows. This prior patent does not disclose an arrangement for transversely aligning the two rows of articles after they are formed from the single row.

DISCLOSURE OF INVENTION

According to this invention in one form, a pair of screws for dividing a single row of articles into two rows contemplates the removal of the thread of one screw at the outfeed end thereof for a distance axially of the screw which is approximately equal to the dimension of the article in the longitudinal direction of feed so as to render that screw ineffective to impart longitudinal feeding movement to the article associated therewith while at the same time an outfeed conveyor receives the articles from between the screws and operates at a velocity which is one-half the velocity of longitudinal movement of the articles between the screws so that the other article is moved at twice the velocity of its companion article and into a position of alignment therewith.

According to a modification of the invention, one screw at the outfeed end thereof may be modified so as to change the pitch of its thread in a manner to advance the associated article at a more rapid rate than normal and the thread of the other screw may be arranged so as to retard the movement of its associated article until such time as the articles are disposed in transverse relation to each other. Normally advancing and retarding the threads of the two screws is effected during a 180° rotation of both screws and is accomplished at the outfeed ends thereof.

BRIEF DESCRIPTION OF THE DRAWINGS

In the drawing FIG. 1 is a somewhat schematic overall plan view of a pair of divider screws constructed according to the invention and FIG. 2 is a side view of the arrangement shown in FIG. 1.

BEST MODE OF CARRYING OUT THE INVENTION

In the drawings the numerals 1 and 2 designate a pair of oppositely threaded tapered screws having threads 3 and 4 and corresponding grooves 5 and 6 respectively. Screw 1 is rotatably mounted in bearings 7 and 8 and is driven by any suitable means such as a chain arranged to cooperate with a sprocket 9 mounted on an extension of screw 1. Screw 2 is rotatably mounted in bearings 10 and 11 and rotation is imparted to screw 2 by a suitable chain 12 which cooperates with a sprocket 13 mounted on an extension of screw 2. Thus as viewed from the left, screw 1 rotates in a counterclockwise direction while screw 2 rotates in a clockwise direction.

Instead of the oppositely threaded screws, it is within the scope of this invention to employ screws which are threaded in the same direction either right or left hand in which case the screws are rotated in the same direction.

Articles arranged in a single row as indicated at A1 and A2 are brought into the space between the screws 1 and 2 by an infeed conveyor 14 which is of conventional construction and which at its right hand end is associated with a pulley 15 rotatably mounted on a shaft 16. The working reach 14a of the belt 14 moves from left to right as indicated by the arrow 17. The velocity of movement of the infeed conveyor 14 is slightly in excess of the velocity of movement of the articles between the screws 1 and 2 in a longitudinal direction from left to right so that the articles are in contact with each other and thus remain in proper positions to move laterally into the grooves 5 and 6 formed in the threads 1 and 2.

As is obvious from the drawings, the grooves 5 and 6 become progressively wider in the direction of longitudinal movement of the articles from left to right. This is due to the fact that the articles are oval or round in horizontal cross section and gradually shift laterally as a particular article progresses from left to right.

While the articles such as A1 and A2 are of generally eliptical cross section, it will be understood that the invention is not limited for use with articles having such a cross-sectional configuration but is adapted for use in connection with articles having other cross-sectional configurations such as round, square, rectangular and the like.

From FIG. 1 it is apparent that alternate articles such as A5 and A6 have begun their lateral movement and that articles A9 and A10 have moved in a lateral direction a progressively greater distance than articles A5 and A6. Article A11 is disposed adjacent the cutaway portion 18 of thread 3 so that screw 1 is ineffective to impart movement toward the right to article A11. It is apparent from FIG. 1 that the cutaway portion 18 in the axial or longitudinal direction of screw 1 extends for an axial distance equal to the dimension of the article such as A11 in the direction of longitudinal movement thereof. It is also apparent from FIG. 1 that screw 6 is not cut away at the outfeed end 6a thereof so that article A10 is moved from left to right by screw 6a from the position shown in FIG. 1.

According to one feature of the invention, an outfeed conveyor 19 is associated with a pulley 20 rotatably mounted on shaft 21 and receives articles from a dead plate 22 which is interposed between the working reaches 14a and 19a of conveyors 14 and 19 respectively. The velocity of linear movement of the working reach 19a of outfeed conveyor 19 is approximately one-half the velocity of linear movement of the articles longitudinally between the screws 1 and 2. Thus article A11 is moved from left to right from the position shown in FIG. 1, for example, to the position represented at A12 by the outfeed conveyor 19. Such movement of course is the equivalent of the dimension of the article in the direction of movement. In the meantime article A10 is moved to the position indicated at A13 by the portion 4a of thread 4 from the position indicated at A10 to that indicated at A13 in the time required for article A11 to move to the position indicated at A12 because the velocity of longitudinal movement between the screws is twice the velocity of movement of the working reach 19a of the outfeed conveyor 19. Thus article A10 moves into a position of transverse alignment with article A11 as indicated at A12 and A13 in FIG. 1.

It is apparent from FIG. 1 that the screws 1 and 2 are generally tapered in configuration so that the diameter of the threads 2 and 3 becomes progressively greater from left to right and the grooves 5 and 6 become progressively deeper from left to right. By this means positive control of the articles is maintained throughout their paths of movement between the screws 1 and 2.

Instead of cutting away the thread 3 as indicated at 18 in FIG. 1, this thread could be continued but arranged so as to retard the movement of article A11 from left to right. Such retardation could be achieved by reducing the pitch of thread 3 at the outfeed end thereof while simultaneously the pitch of thread 4 could be increased at the outfeed end thereof so as to accelerate the movement of article A10 sufficiently to bring that article into alignment with the retarded article A11 so that the articles would then occupy positions of transverse alignment as represented at A12 and A13 in FIG. 1.

INDUSTRIAL APPLICABILITY

While this invention is primarily intended for use as a means of dividing a single row of consumer items into two rows for subsequent processing through a high speed packaging machine, the invention is not limited to this application and may be used in connection with article handling procedures generally where a single row of articles must be divided into two rows.

We claim:

1. Apparatus for dividing a single row of articles into two rows, said apparatus comprising a pair of complementary closely spaced parallel screws arranged with the spiral thread of one screw in coincidental relation with the spiral groove of the other screw, and means for rotating said screws so that alternate articles of a row of articles fed to the infeed ends of said screws and along a longitudinal path parallel to the axes thereof are engaged by the thread of each screw and moved laterally into the groove of the other screw to form two rows of articles and the thread of at least one of said screws being modified at the outfeed end thereof so as to render said one screw less effective to impart longitudinal movement to an article at the outfeed end thereof than the other screw and thereby transversely to align adjacent articles in the two rows with each other.

2. Apparatus according to claim 1 wherein said screws are oppositely threaded and are rotated in opposite directions.

3. Apparatus according to claim 1 wherein said screws are threaded in the same hand and are rotated in the same direction.

4. Apparatus according to claim 1 wherein an outfeed conveyor disposed along the outfeed ends of said screws is arranged to receive and move the articles away from said screws and wherein the thread of said one screw is cutaway at the outfeed end thereof.

5. Apparatus according to claim 4 wherein said outfeed conveyor is arranged to move the two rows of articles at a velocity which is less than the longitudinal movement of the articles between said screws.

6. Apparatus according to claim 4 wherein said outfeed conveyor is arranged to move the article at a velocity which is approximately one-half the velocity of longitudinal movement of the articles between said screws.

7. Apparatus according to claim 4 wherein said outfeed conveyor is disposed underneath the outfeed ends of said screws.

8. Apparatus according to claim 1 wherein an infeed conveyor disposed along the infeed end of said screws is arranged to supply a row of articles between said screws.

9. Apparatus according to claim 8 wherein the velocity of said infeed conveyor is somewhat in excess of the velocity of longitudinal movement of articles between said screws.

10. Apparatus according to claim 8 wherein said infeed conveyor is disposed underneath the infeed ends of said screws.

11. Apparatus according to claim 1 wherein an infeed conveyor is disposed underneath the infeed ends of said screws and an outfeed conveyor is disposed underneath the outfeed ends of said screws and wherein a dead plate is interposed therebetween.

12. Apparatus according to claim 6 wherein the thread of the other of said screws at the outfeed end thereof is effective to impart longitudinal movement to a succeeding article at the outfeed end thereof for a predetermined period of time after a preceding article engages the modified portion of the thread of said one screw.

13. Apparatus according to claim 12 wherein said predetermined period of time is sufficient for said succeeding article to move into a position of transverse alignment with said preceding article.

14. Apparatus according to claim 4 wherein said cutaway portion of said one screw in the direction of longitudinal movement of the articles is approximately equal to the dimension of an article in the direction of longitudinal movement and the speed of said outfeed conveyor being approximately one-half the speed of movement of the articles between said screws in the direction of longitudinal movement thereof.

* * * * *